Nov. 17, 1936.   O. J. SUNDSTRAND   2,060,954
BOOKKEEPING MACHINE
Filed May 9, 1932   5 Sheets-Sheet 1
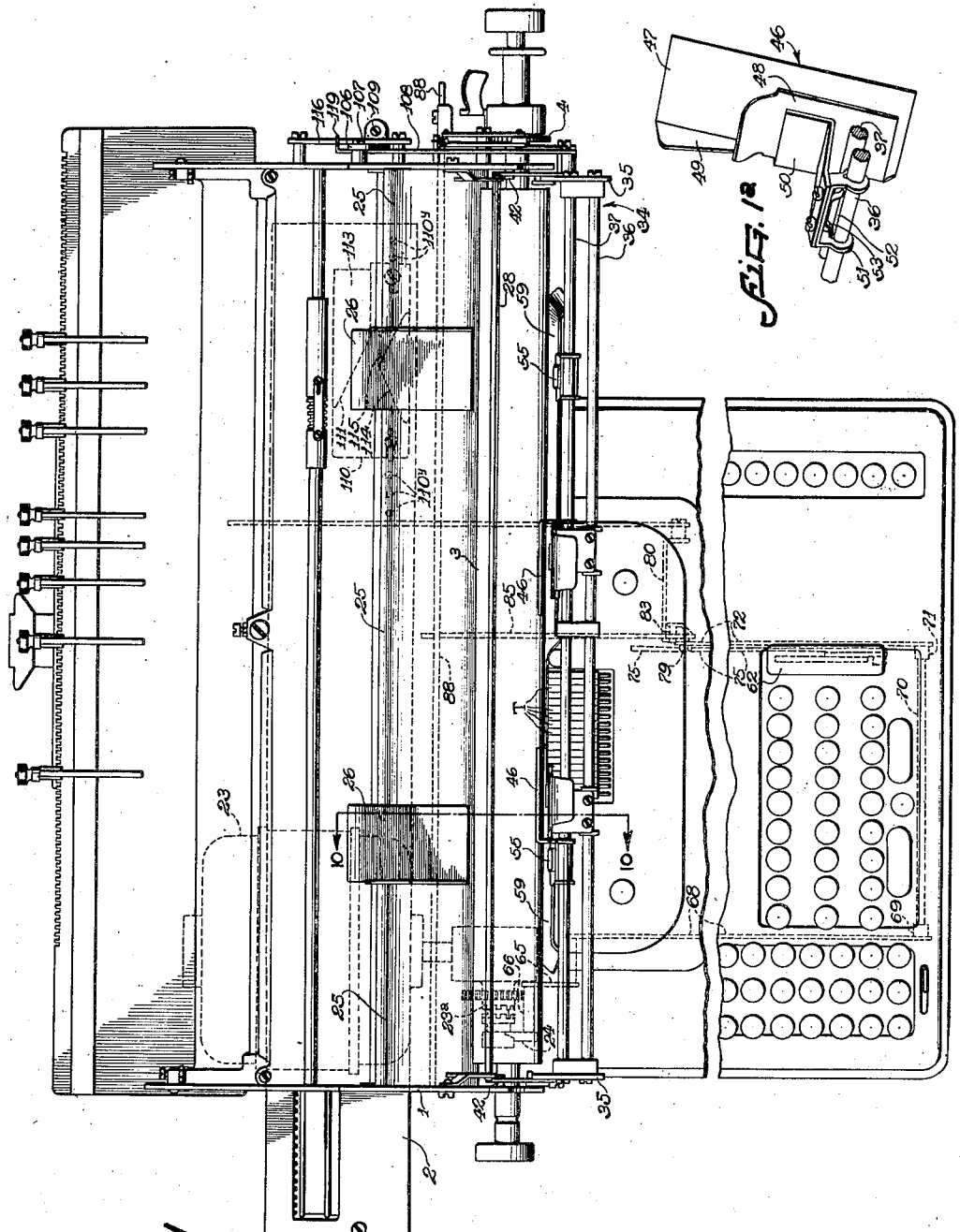
Inventor
Oscar J. Sundstrand
By Chindahl Parker Karber
Attorneys Nov. 17, 1936.  O. J. SUNDSTRAND  2,060,954
BOOKKEEPING MACHINE
Filed May 9, 1932  5 Sheets-Sheet 2
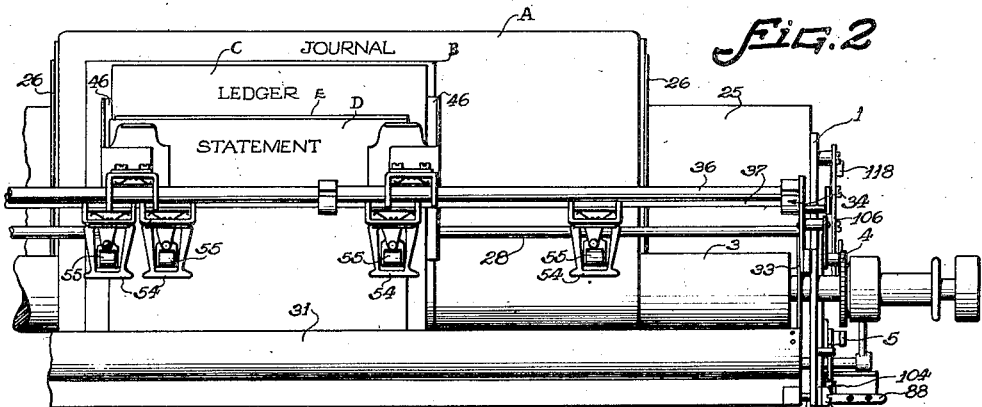
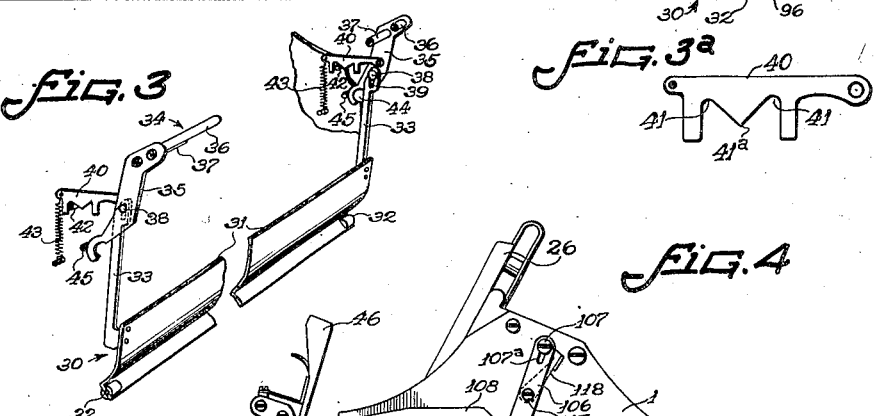
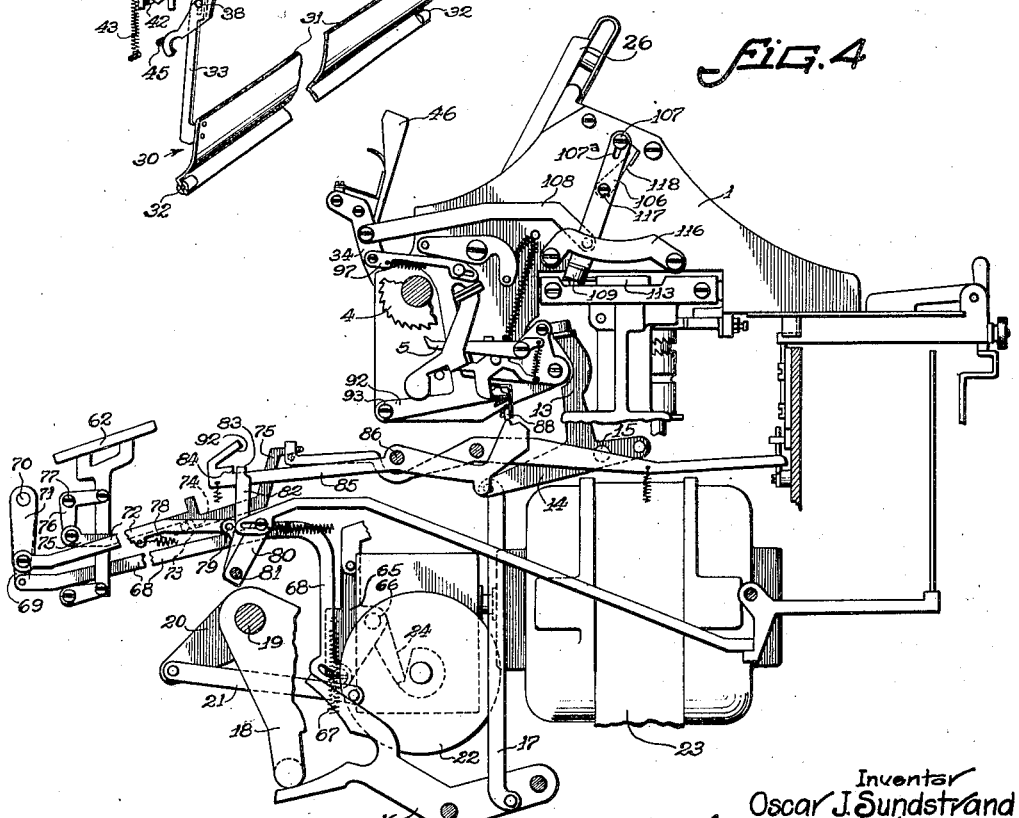
Inventor
Oscar J. Sundstrand
By Chindahl Parker Carlson
Attorneys Nov. 17, 1936.  O. J. SUNDSTRAND  2,060,954
BOOKKEEPING MACHINE
Filed May 9, 1932   5 Sheets-Sheet 3
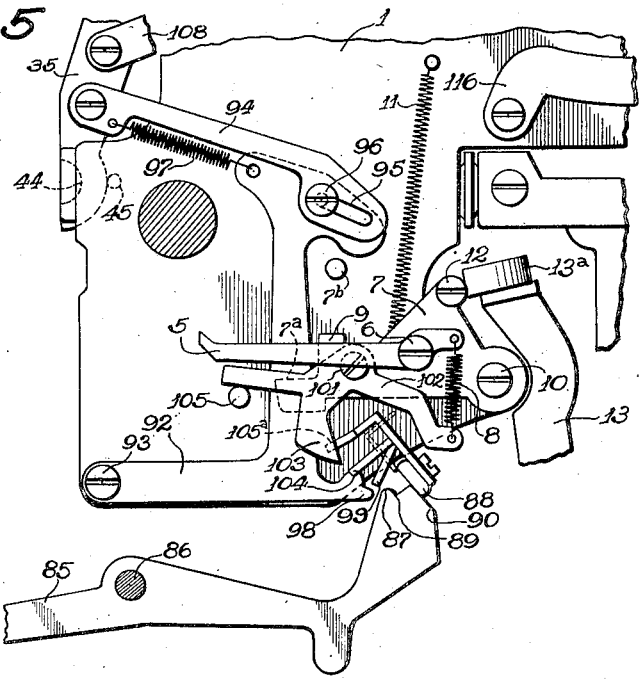
Inventor
Oscar J. Sundstrand
By Churchill Parker Carlson
Attorneys Nov. 17, 1936.    O. J. SUNDSTRAND    2,060,954
BOOKKEEPING MACHINE
Filed May 9, 1932    5 Sheets-Sheet 4
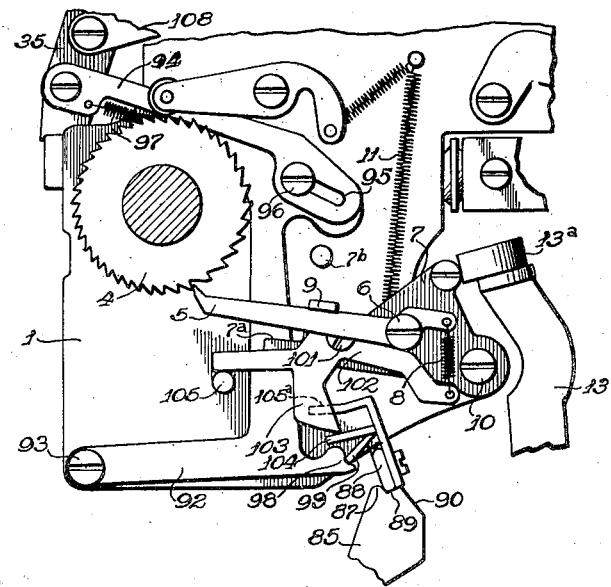
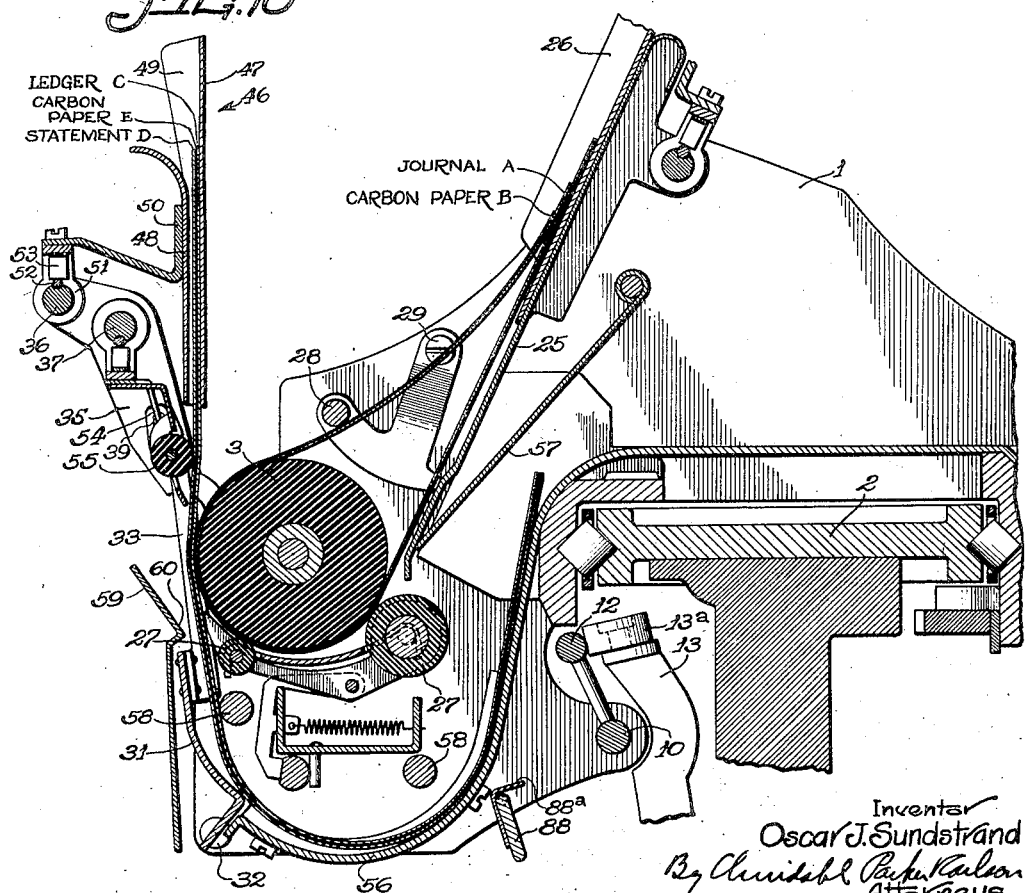

Nov. 17, 1936.   O. J. SUNDSTRAND   2,060,954
BOOKKEEPING MACHINE
Filed May 9, 1932          5 Sheets-Sheet 5
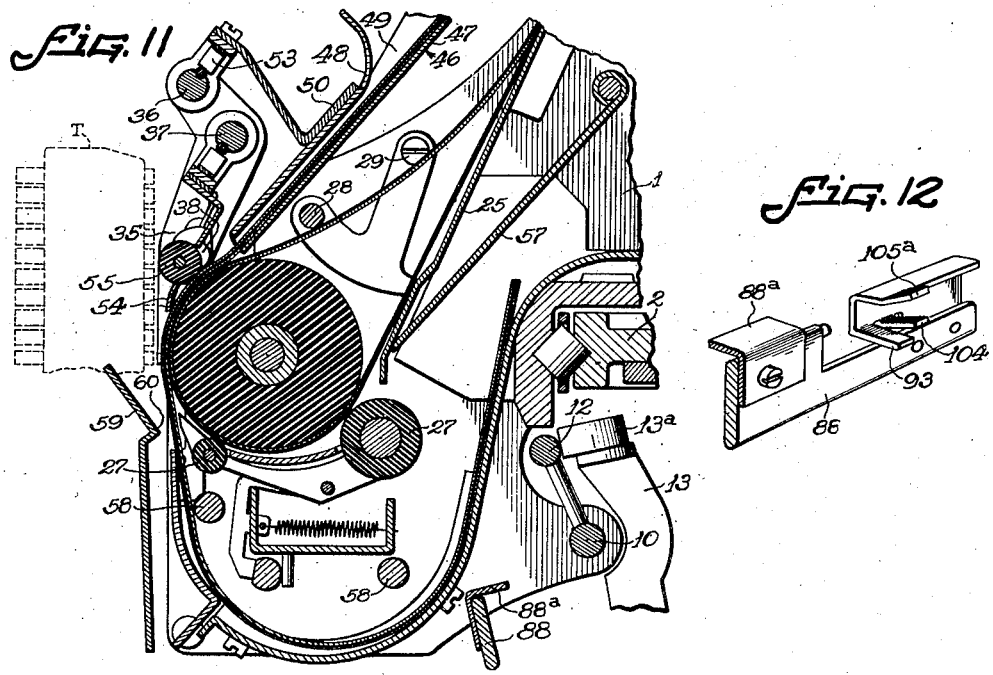
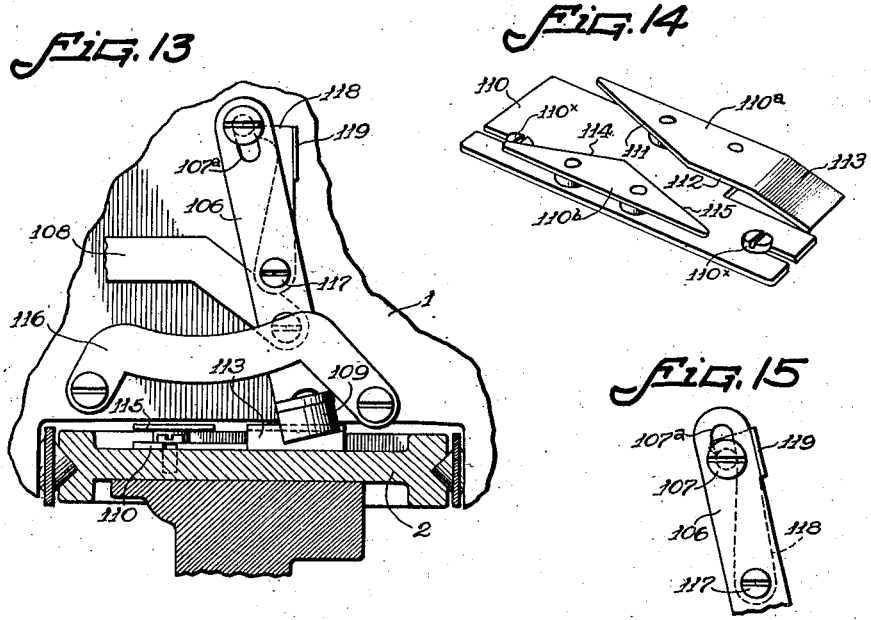
Inventor
Oscar J. Sundstrand
By Chindahl Parker Carlson
Attorneys Patented Nov. 17, 1936

2,060,954

UNITED STATES PATENT OFFICE 2,060,954

BOOKKEEPING MACHINE

Oscar J. Sundstrand, Rockford, Ill., assignor, by mesne assignments, to Underwood Elliott Fisher Company, New York, N. Y., a corporation of Delaware Application May 9, 1932, Serial No. 610,043

44 Claims. (Cl. 197—128)

This invention relates to means for holding in printing position the work-pieces employed in mechanical bookkeeping, and to means for facilitating the insertion and removal of certain of the work-pieces. It is customary to make a carbon copy of the postings on a so-called journal or audit sheet which remains in the machine while items are being posted to a considerable number of ledger accounts. It is also customary to employ means whereby the ledger sheet and the monthly statement may be inserted and removed without disturbing the journal sheet. In the prior art the ledger sheet and the statement were inserted and supported in such a way as to interfere with the visibility of the face of said sheets, with consequent difficulty in properly collating or positioning the ledger sheet and the statement with reference to each other and with reference to the journal sheet.

One of the salient objects of this invention is to provide means whereby the ledger sheet and the statement or analogous work-pieces may be inserted face forward and bottom edge downward into operative relation to the platen and the journal sheet, without sacrificing visibility of that portion of the face of the ledger sheet and statement which the operator needs to see in collating the work-pieces.

Another object is to provide means capable of being readily positioned for the convenient insertion of the ledger sheet and the statement down past the front of the platen, and for the convenient removal of said sheets after entries have been made thereon.

A further object is to provide means for automatically locking or disabling the motor bar when the front feed means is in paper-released position.

A further object is to provide means for automatically enabling or unlocking the motor bar when the front feed means is placed in position to hold the work-pieces against the platen.

A further object is to prevent the front feed means from being left in the forward or paper-released position after the motor-bar has been depressed and until the machine has cycled.

A further object is to provide means for automatically releasing the ledger sheet and the statement as the carriage is returning to the initial position.

A further object is to provide paper chutes and paper fingers which may be slid to various relative positions without interference of the fingers with the chutes or vice versa.

In the accompanying drawings,

Figure 1 is a plan view of a machine embodying the features of my invention, parts being broken away to shorten the view. The carriage is shown in its initial position, with the front paper-feed devices in their forward or loading position.

Fig. 1ª is a perspective view of one of the paper chutes.

Fig. 2 is a partial front view of the carriage.

Fig. 3 is a fragmental perspective view of the front paper-feed devices.

Fig. 3ª is a detail view of one of two detents employed to hold the front paper-feed devices in either of their two positions.

Fig. 4 is a fragmental right-hand elevation of the machine, the front paper-feed devices being in their forward position, and the motor bar being locked against effective depression.

Fig. 5 is a fragmental right-hand elevation of the carriage, showing the front paper-feed devices in the operative rear position, the motor bar (not shown) being unlocked.

Fig. 6 shows related parts in the same position as in Fig. 5.

Figs. 7 and 8 are similar to Figs. 5 and 6, but show the positions assumed when the motor bar is depressed. The front paper-feed devices are shown as though being held in forward position by the operator against the tension of the spring 100.

Fig. 9 illustrates the operation of releasing the devices that yieldably latch the front paper-feed devices in rear position.

Fig. 10 is a vertical section through the carriage, with the front paper-feed devices in forward position.

Fig. 11 is a similar view showing the front paper-feed devices in rear position.

Fig. 12 is a fragmental perspective view of a portion of the locking mechanism.

Fig. 13 illustrates the mechanism for automatically placing the front paper-feed devices in forward position.

Fig. 14 is a perspective view of a cam device comprised in the last-mentioned mechanism.

Fig. 15 is a fragmental view of certain parts comprised in said mechanism.

The present invention may be embodied in machines of various types, as, for example, those disclosed in my applications Serial Nos. 118,628 and 581,800, filed June 26, 1926, and December 18, 1931, respectively. In this instance, I have chosen for illustration a machine similar to that shown in said application Serial No. 581,800, to which reference may be made for information regarding details not herein fully disclosed.

The form and construction of the paper carriage may be of any desired nature. Herein the carriage framework is designated generally by the numeral 1 (Fig. 4). The carriage may be supported upon the stationary framework of the machine in various ways, the means herein shown comprising a transverse track member 2 fixed in the machine frame, antifriction bearings being interposed between the carriage and the track member. The means for moving the carriage toward the left in the tabulating movement and for returning the carriage to the initial position may be of the character described in my application Serial No. 581,800 or any other desired type.

In the carriage 1 is rotatably mounted a platen 3 (Fig. 10) which may be rotated by any preferred means, that herein shown comprising a ratchet wheel 4 (Fig. 9) on the right-hand end of the platen, said wheel being arranged for engagement by a dog 5. The latter is pivoted at 6 on a plate 7, and is urged toward the ratchet wheel by a spring 8. A stop lug 9 on the plate 7 limits the action of the spring. The plate 7 forms the right-hand end of a rigid frame that is pivoted in the carriage on the axis 10. A spring 11 tends to swing the frame rearwardly to retract the dog 5. The action of the spring 11 is limited by engagement of the lug 7a on the plate 7 with a stop pin 7b. The upper bar 12 (Fig. 10) of said frame is long enough to be engaged by an actuator in any position of the carriage. Said actuator consists of a roller stud 13a carried by an arm 13 which is rigid with a lever 14 (Fig. 4) that is pivoted in the machine frame at 15. The lever 14 is connected to a cam lever 16 by a link 17. Said cam lever is arranged to be swung by an arm 18 fixed upon the main rock shaft 19. Rigid with the shaft 19 is an arm 20 which is connected through a link 21 to a crank disk 22. The latter is driven by an electric motor 23 through the medium of gearing and a clutch 23a (Fig. 1), said clutch being thrown in by a spring and thrown out at the end of each revolution of the crank disk, as fully described in application Serial No. 581,800. Said spring is restrained by a dog 24.

When cross-tabulated work is being done, the line-space mechanism is normally disabled except at the end of the work stroke of the carriage, as fully explained in said application Serial No. 581,800.

The journal sheet A and the carbon sheet B are fed to the platen from the rear thereof, and for this purpose there is provided an apron 25 secured to the carriage framework so as to extend in an upwardly and rearwardly inclined position with the lower edge of the apron adjacent to the rear side of the platen. Two guides 26 for the side edges of the sheets A and B are adjustably mounted upon the apron.

Means of any preferred construction may be used to hold the sheets A and B in contact with the lower side of the platen. Herein I have shown feed rolls 27 of the usual type. A bail 28 (Fig. 10) pivoted to the ends of the carriage at 29 serves to hold the sheets A and B down out of the way after they have passed the platen.

The ledger sheet C, the statement sheet D or similar work-pieces, together with any necessary carbon sheets, as E, are fed into printing position from in front of the platen. The means that permits such insertion comprises a rigid frame 30 (Fig. 3) which includes a longitudinal curved plate 31 the ends of which are pivoted to the ends of the carriage frame at 32. The frame 30 further comprises two bars 33 fixed to and rising from the ends of the plate 31. Pivoted to the upper ends of the bars 33 is an upper frame 34 consisting of two end pieces 35 and two cross-bars 36 and 37. The pivot pins 38 (Fig. 3) for the frame 34 are fixed to the end pieces 35 and extend through elongated openings 39 in the upper ends of the bars 33.

The frames 30 and 34 are held in their forward or paper-receiving position or in their rear or paper-holding position by means which may partake of various forms but which is herein shown as comprising two detents 40 (Fig. 3a), each detent being pivoted to one of the end-pieces 35 and being provided with two notches 41 to receive a pin 42 on the end wall of the carriage. The adjacent walls of the notches are inclined to form a V-point 41a. Springs 43 (Fig. 3) connected to the rear ends of the detents 40 yieldingly hold the detents in engagement with the pins 42, and serve to complete the movement of the frames 30 and 34 in either direction as soon as the V-points 41a have passed the pins 42.

The upper frame 34 is pivoted to the end walls of the carriage by means herein shown as comprising two studs 44 and 45 (Fig. 8) on each of said end walls, the lower ends of the end-pieces 35 being curved to fit slidably between said studs.

The bar 36 supports two paper chutes 46 (Fig. 1a) for the work-pieces that are to be fed down past the front of the platen. Each chute consists of a rear wall 47, a front wall 48 and an end wall 49 that joins the walls 47 and 48 and constitutes a guide for one side edge of the work-pieces. The chutes are attached to the bar 36 for adjustment longitudinally of the bar in accordance with the width of the work-pieces. For this purpose the front wall of the chute is fixed to a bracket 50 which is attached to a slide 51 mounted on the bar 36. A spline 52 holds the slide against rotation on the bar, and a spring 53 yieldingly holds the slide in adjusted position.

Paper fingers 54 (Figs. 2 and 10) of any preferred construction are slidably mounted on the bar 37. These fingers carry feed rolls 55. As shown in Fig. 10 the chutes 46 extend adjacent to and rearwardly of the fingers 54. As will be understood from Fig. 11, the feed rolls 55 are of such diameter and so located as to be out of the way of the type bars when the latter rise in the printing operation. Hence the paper fingers may be positioned anywhere on the bar 37 without regard to the type bars or the columns of imprints. A type bar T in position to print the numeral "9" is indicated in dotted lines in Fig. 11.

When the frames 30 and 34 are in their forward position, as shown in Fig. 10, and the work-pieces are inserted into the chutes 46, the latter serve to guide the lower edges of the work-pieces to the rear of the fingers 54. The latter then guide the lower edges of the sheets into the space between the platen and the fingers. The curved plate 31 then guides the sheets under the platen, after which the sheets are guided upwardly to the rear of the platen by a curved plate 56 fixed in the carriage frame. A baffle plate 57 also fixed in the frame of the carriage behind the apron 25 directs the sheets away from the apron. Rollers 58 journaled in the ends of the carriage within the curved path taken by the work-pieces C, D and E serve to keep said sheets out of contact with the feed rolls 27 and the means for moving said rolls into and out of operative position.

An elongated guide plate 59 (Fig. 10) fixed in the machine frame in front of and close to the path of movement of the carriage, has a portion 60 that overhangs the upper edge of the plate 31 when the latter is in its forward position, said overhanging portion acting to guide the lower edges of the work-pieces to the rear of the plate 31 and thus prevents the paper from fouling on the upper edge of said plate 31.

When the frames 30 and 34 are in their rear position, as shown in Fig. 11, the rolls 55 hold the work-pieces C, D and E against the front side of the platen, the sheets A and B being between the sheets C, D and E and the surface of the platen.

The lower edges of the paper fingers 54 serve as line-finders or line-gages in locating the work-pieces C and D in proper relation to the printing line, i. e., the horizontal plane extending through the axis of the platen. When inserting the sheets C, D and E into the machine, the operator positions the last line of imprints on the statement just below the lower edges of the paper fingers. When the frames 30 and 34 are swung back, no material amount of shifting occurs between such line of imprints and the lower edges of the paper fingers. It will be noted that the lower ends of the paper fingers extend close to the axis of the frame 34.

It should not be possible to operate (i. e., "cycle") the machine while the frame 34 is in its forward position, since the type bars T might strike the feed rolls 55. Moreover, the work-pieces C, D and E are loose at such time. I therefore provide means for locking the motor bar 62 against effective operation when the frame 34 is held out of its normal or paper-holding position by the detents 40. While this locking means may partake of various forms, that herein shown is arranged to cooperate with a motor drive of the character fully described in my application Serial No. 581,800. The dog 24 (Fig. 4) is rigidly attached to an arm 65 which is pivoted in the machine frame at 66. A spring 67 connected to the arm 65 normally holds the dog 24 in effective position. The arm 65 has a pin-and-slot connection with the rear end of a link 68. The forward end of the link 68 is pivoted to a crank arm 69 which is fixed on the left-hand end of a rock shaft 70. On the right-hand end of said shaft is secured an arm 71 to which is pivoted the forward end of a link 72. On the rear portion of the link 72 is a stud 73 which is adapted to be engaged by a shoulder 74 on a link 75. The forward end of the link 75 is pivoted to one arm of a bell crank 76 that is pivoted at 77 in the machine frame. To the other arm of the bell crank is connected the stem of the motor bar 62. A spring 78 connected to the link 72 tends to draw said link rearwardly and thus normally holds the motor bar elevated. Assuming that the stud 73 is in the path of the shoulder 74, it will be seen that depression of the motor bar will swing the dog 24 out of effective position, thereby allowing the clutch to go into engaged position, whereupon the crank disk 22 will be given one revolution.

The rear end of the link 72 is pivoted at 79 (Fig. 6) to an arm 80 which is pivoted at 81 in the machine frame. Fixed to the arm 80 is a finger 82 having an angular upper end 83 that is adapted to lie behind a shoulder 84 on the forward portion of a lever 85. Said lever is pivoted at 86 in the machine frame. It will be seen that when the lug 83 lies behind the shoulder 84 (as in Fig. 4), the motor bar 62 cannot be depressed far enough to withdraw the detent 24 from effective position. On the rear end of the lever 85 is a surface 87 (Fig. 5) to bear against the lower edge of a locking bar 88, as in Fig. 4, said bar being pivoted near its ends in the end walls of the carriage and being long enough to coact with the lever 85 in any position of the carriage. A long angular web 88ª (Fig. 12) fixed to the bar 88 serves to stiffen it. Rearwardly of the surface 87 is a locking notch 89 to receive the lower edge of the bar 88 (as shown in Fig. 8). Behind the notch 89 is a surface 90 along which the front side of the bar 88 may slide in the travel of the carriage, as illustrated in Fig. 5. A spring 91 (Fig. 6) tends to tilt the lever 85 in the direction to withdraw the locking shoulder 84 from the lug 83.

When the frames 30 and 34 are pushed from the paper-receiving position shown in Fig. 4 to the paper-holding position shown in Fig. 5, the motor bar is unlatched. A latch arm 92 is pivoted on the right-hand end wall of the carriage at 93, and is yieldingly connected to the frame 34 by means of a link 94. In the rear end of the link 94 is an elongated opening 95 through which extends a stud 96 on the latch arm 92. A spring 97 is stretched between the latch arm 92 and the link 94. When the frames 30 and 34 are placed in their rear position, a lug 98 on the latch arm 92 is arranged to engage a lug 99 on the bar 88 and force said bar from the position shown in Fig. 4 to that illustrated in Fig. 5. The spring 91 is then free to tilt the lever 85 into the position shown in Figs. 5 and 6, whereby the locking shoulder 84 is withdrawn from the lug 83. The motor bar may now be depressed to cycle the machine. Depression of the motor bar forces the lug 83 against a cam surface 100 (Fig. 6) on the forward end of the lever 85, whereby said forward end is lifted (see Fig. 7) and the rear end lowered, thus allowing the bar 88 to fall into the notch 89, as in Fig. 8. Such movement of the bar 88 places the lug 99 over the lug 98, thus restraining the latch arm 92 from upward movement.

It may happen that the electric current is off at the time the motor bar is depressed, and in such event the machine will not cycle until current is again supplied. If in the meantime the frames 30 and 34 could be pulled forward, as in Fig. 8, and left in such position, the operation of the machine upon the resumption of flow of current might cause the type bars to strike the feed rolls 55. Such an accident is guarded against by the construction just described, as the latch arm 92 is held against upward movement and the spring 97 would return the frames 30 and 34 to their rear position as soon as the operator released the frames, said spring overcoming the springs 43 (Fig. 3).

Upon cycling of the machine the motor-bar controlling devices are restored to the position shown in Fig. 5 by means to be now described. On the plate 7 (Fig. 9) is pivoted at 101 a lever 102. The spring 8 is stretched between the dog 5 and one arm of the lever 102 and tends to turn said lever counter-clockwise. The lever 102 has a cam lug 103 which is arranged to depress a lug 104 on the bar 88. In the first half of each cycle of operations of the machine (except the cycle performed in the last columnar position), when the arm 13 swings rearwardly, the bar 12 is permitted to follow the roller 13ª just far enough to place the cam lug 103 above the lug 104. In the last half of the cycle, the roller 13ª moves the bar 12 forward again, thereby causing the cam lug 103 to depress the lug 104 far enough to disengage the bar 88 from the notch 89, whereupon the spring 91 lifts the rear end of the lever 85 into the position shown in Fig. 5. When the cam lug 103 is thus moved downwardly it is also moved forward far enough to be clear of the lug 104 by reason of the engagement of the forward end of the lever 102 with a pin 105 on the carriage end wall, such engagement causing the lever 102 to turn clockwise.

Upon cycling of the machine in the last columnar position, the front-feed controlling devices and the motor-bar controlling devices operate as just described, and line-spacing occurs. In the first half of that cycle the bar 12 is permitted to make a full stroke rearwardly as the roller 13a moves in that direction, the dog 5 being thereby retracted to engage a tooth of the ratchet wheel 4. In the second half of the cycle, the dog 5 turns the ratchet wheel to effect line-spacing. In Fig. 9 the plate 7 is represented as still swinging forward and down, the dog 5 being about to slip out of engagement with the ratchet tooth.

After the machine has cycled in the last columnar position it is automatically returned to the first columnar position by means which may be of any preferred construction, as, for example, that fully described in my application Serial No. 581,300 and in Patent No. 1,901,135, dated March 14, 1933.

Means is provided for automatically placing the frames 30 and 34 in position for the withdrawal of the ledger sheet and the statement while the carriage is thus returning to its initial position. The means chosen to exemplify this feature of the invention comprises an arm 106 (Fig. 4) pivoted on a stud 107 on the right-hand end wall of the carriage, said stud extending through an elongated opening 107a in the upper end of the arm. Said arm is connected to the frame 34 through the medium of a link 108. On the lower end of the arm 106 is a roller 109 arranged to engage a cam device during the return movement of the carriage. This device is shown in dotted lines in the plan view entitled Fig. 1 and in Figs. 13 and 14. It comprises a base plate 110 secured to the top of the track member 2 for adjustment longitudinally of said track member by means of screws 110x which may be driven into any of a series of holes 110y (Fig. 1) in the track member 2. The adjustability of the cam device permits the point of throw-out of the front-feed frames to correspond to the width of the work-pieces C and D. On this base plate are fixed two plates 110a and 110b (Fig. 14) defining a cam track between them. One of these plates has an inclined or cam edge 111, a straight edge 112 and an inclined surface 113. The other plate has inclined edges 114 and 115. In the return movement of the carriage the roller 109 engages the edge 111 and is forced forward, thereby swinging the frames 30 and 34 forward until the V-points 41a (Fig. 3a) have passed the pins 42 (Fig. 3), whereupon the springs 43 complete the movement of the frames 30 and 34 into their forward position, the roller 109 following the edge 115. The ledger sheet and the statement to which postings have just been made are thus released so that they may be withdrawn and the ledger sheet and statement of another customer substituted.

When the frames 30 and 34 are thus swung forward, the link 94 raises the latch arm 92, the lug 98 engaging a lug 105a on the bar 88 and forcing said bar from the surface 90 to the surface 87, as shown in Fig. 4, thus locking the motor bar against operation.

When the carriage is in the initial position the roller 109 is at the right of the inclined surface 113 (see Fig. 1), so that there is no interference with the manual return of the frames 30 and 34 to their rear or operative position. Such positioning of the frames 30 and 34 places the roller 109 in line with the inclined surface 113, consequently when the carriage is tabulated out of its initial position the roller 109 rides up on said surface and is carried back over the plate 110a, said roller dropping as soon as said plate has been passed. The elongated opening 107a permits such elevation of the arm and roller. A guide bar 116 (Fig. 13) fixed to the end wall of the carriage confines the arm 106 against lateral displacement.

The means for automatically releasing the ledger sheet and the statement may be disabled, when desired, by raising the arm 106 sufficiently to place the roller 109 above the horizontal plane of the plates 110a and 110b. For this purpose there is pivoted to the arm 106 at 117 a hook 118 adapted to be swung into engagement with the stud 107, as shown in Fig. 15, to hold the arm in elevated position. 119 is a handle portion on said hook.

The operation is as follows: Assume the carriage to be in its initial position, and the front paper-feed devices to be in their forward position, as shown in Figs. 1, 4 and 10, the motor bar being latched against depression: The operator inserts the ledger sheet, the statement or the other work-pieces which are to be inserted downwardly in front of the platen. The statement may, if desired, be of the "fold-over" type, the entries upon the ledger sheet being a carbon copy of those on the statement. These sheets having been inserted sufficiently to bring the next line to be printed upon at the printing line, the operator pushes the bar 36 back, thus placing the frames 30 and 34 in the position illustrated in Figs. 5 and 11. The rearward motion of the frame 34 is transmitted through the link 94 (Fig. 5) to the latch arm 92, the lug 98 of which pushes against the lug 99 and thereby shifts the bar 88 from the position shown in Fig. 4 to that illustrated in Fig. 5. The spring 91 (Fig. 6) is thus permitted to tilt the lever 85 into the position represented in Figs. 5 and 6, the shoulder 84 being withdrawn from in front of the lug 83, and the motor bar being thereby released. After setting up the desired matter upon the keyboard, the operator depresses the motor bar 62. This causes the lug 83 to cam the surface 100 upwardly, as shown in Fig. 7, thus lowering the rear end of the lever 85 sufficiently to allow the bar 88 to gravitate into the notch 89, as in Fig. 8. In the first half of the ensuing cycle the cam lug 103 rises above the lug 104. In the second half of the cycle, the cam lug 103, acting on the lug 104, swings the bar 88 rearwardly, and the spring 91 places the lever 85 in the position shown in Figs. 5 and 6. The carriage tabulates to the next columnar position, where depression of the motor bar will cause a repetition of the operations just described.

Upon depression of the motor bar with the carriage in the last columnar position, the operations just described are repeated accompanied by line-spacing, and return movement of the carriage to the initial position.

In the return movement of the carriage, the roller 109 (Fig. 13) strikes the inclined edge 111, whereby the frames 30 and 34 are swung forward to release the work-pieces C, D and E, the paper chutes 46 causing the work-pieces to move forward away from the platen. This occurs before the return movement of the carriage has been completed, thus making it possible for the operator to pull said work-pieces out of the machine while the carriage is returning. When the frames 30 and 34 are thus swung forward, the link 94 lifts the latch arm 92 into the position shown in Fig. 4, the lug 98 engaging the lug 105ª and thereby forcing the bar 88 from the position shown in Fig. 5 to that illustrated in Fig. 4. The motor bar is thereby locked against operation.

It will be seen that the front-feed frames 30 and 34 may be swung into their forward positions and left there in any columnar position of the carriage, provided the machine cycled after depression of the motor bar. If such cycling did not occur, as would be the case if the supply of current were interrupted, the front-feed frames may be drawn forward, but will return to their rear position as soon as the operator releases them.

When the front-feed frames are in their rear position, the motor bar is free to be operated, but the motor bar is latched against depression while the front-feed frames are held in their forward position by the detents 40, whether said frames have been placed in said position automatically or manually.

While the present drawings illustrate the ledger sheet and the statement as being superposed, one upon the other, it will be evident that the paper chutes 46 and the paper fingers 54 may be positioned to support the ledger sheet and the statement side by side.

I claim as my invention:

1. A bookkeeping machine having, in combination, a paper carriage, a platen mounted in the carriage for rotation on a fixed axis, a paper-holding frame pivoted on the carriage to swing toward and away from the platen, a detent tending to hold said frame in either of its two positions, a latch arm pivoted on the carriage, a link having a pin-and-slot connection with said latch arm and connected to said frame, a spring tending to swing the frame and latch arm toward each other, a bar pivoted on and extending longitudinally of the carriage, a lug on said bar arranged to engage and restrain the latch arm, a second lug on said bar arranged to be engaged by the latch arm and thus pivotally move said bar, means including a pivoted element for imparting line-space movements to the platen, a lever pivoted on said element, a third lug on said bar arranged to be engaged by said lever, a manipulative member, and means controlled by said bar for controlling said member.

2. A bookkeeping machine having, in combination, a paper carriage, a platen mounted in the carriage for rotation, a paper-holding frame pivoted on the carriage to swing toward and away from the platen, and means to control said frame comprising a bar pivoted on and extending longitudinally of the carriage, line-space means controlling said bar, a manipulative member, and means controlled by said bar for controlling said member.

3. A bookkeeping machine having, in combination, a paper carriage, a platen rotatably mounted in the carriage, a paper-holding frame pivoted on the carriage to swing toward and away from the platen, a detent tending to hold said frame in either of its two positions, a latch arm pivoted on the carriage, a link having a pin-and-slot connection with said latch arm and connected to said frame, a spring tending to swing the frame and the latch arm toward each other, and releasable means for holding said latch arm in position to place said spring under sufficient tension to overcome said detent.

4. A paper carriage having, in combination, a framework, a platen rotatable in said framework on a fixed axis, a frame pivoted at its ends in said framework to swing on an axis located below and forward of the platen, said frame being approximately as long as the platen, a second frame pivoted to the ends of the first frame, guide means on the second frame for the work-piece, paper fingers on the second frame to hold the work-piece against the platen, and detent means connected to the second frame and tending to hold said frames in either their forward or their rear positions.

5. A paper carriage having, in combination, a framework, a platen rotatable in said framework on a fixed axis, a frame pivoted at its ends in said framework to swing on an axis located below and forward of the platen, said frame being approximately as long as the platen, a second frame pivoted to the ends of the first frame, guide means on the second frame for the work-piece, and paper fingers on the second frame to hold the work-piece against the platen, detent means connected to the second frame and tending to hold said frames in either their forward or their rear positions, and latch means yieldingly connected to the second frame to prevent the detent means from holding said frames in their forward position.

6. A paper carriage having, in combination, a framework, a platen rotatably mounted in said framework, a frame pivoted at its ends in said framework to swing on an axis located below and forward of the platen, said frame being approximately as long as the platen, a second frame pivoted to the ends of the first frame, two paper chutes on the second frame, one for each side edge of the work-piece, and paper fingers on the second frame to hold the work-piece against the platen.

7. A paper carriage having, in combination, a framework, a platen rotatably mounted in said framework, a frame pivoted in said framework to swing on an axis located below and forward of the platen, a second frame pivoted to the first frame, two paper chutes on the second frame, one for each side edge of the work-piece, and paper fingers on the second frame to hold the work-piece against the platen.

8. A paper carriage having, in combination, a framework, a platen rotatably mounted in said framework on a fixed axis, means for guiding a work-piece from the rear of the platen, under and up in front of the platen, a structure pivoted in said framework to swing on an axis located below and forward of the platen, two paper chutes on said structure, one for each side edge of another work-piece to guide such other work-piece down past the front of the platen, and paper fingers on said structure to hold the second-mentioned work-piece against the platen, said chutes and fingers serving to guide the second work-piece independently of the first-mentioned guiding means.

9. A bookkeeping machine having, in combination, a laterally movable paper carriage having a portion movable to a position to permit ready insertion and removal of papers, a platen in said carriage, detent means connected to said portion and tending to hold said portion in or out of said position, latch means to prevent the detent means from holding said portion in said position, and line-space means for the platen arranged to disable the latch means.

10. A bookkeeping machine having, in combination, a laterally movable paper carriage, a platen mounted in the carriage for rotation on a fixed axis, said carriage having a portion movable away from the platen to a position to permit ready insertion and removal of papers, detent means connected to said portion and tending to hold said portion in or out of said position, latch means to prevent the detent means from holding said portion in said position, and line-space means for the platen arranged to disable the latch means.

11. A bookkeeping machine having, in combination, a laterally movable paper carriage, a platen rotatably mounted in the carriage, means above the platen for supporting the back of a work-piece and also affording guidance for the side edges of the work-piece, said means being pivotally supported on the carriage, detent means tending to hold said work-piece-supporting means in either of its pivotal positions, latch means to prevent the detent means from holding said supporting means in one of said positions, and line-space means for the platen arranged to disable the latch means.

12. A bookkeeping machine having, in combination, a laterally movable paper carriage having a portion movable to a position to permit ready insertion and removal of papers, a platen in said carriage coacting with said portion to hold the papers, detent means tending to hold said portion in or out of said position, latch means to prevent the detent means from holding said portion in said position, and means automatically operable in each cycle of the machine for disabling the latch means.

13. A bookkeeping machine having, in combination, a laterally movable paper carriage having a portion movable to a position to permit ready insertion and removal of papers, detent means tending to hold said portion in or out of said position, latch means to prevent the detent means from holding said portion in said position, and means automatically operable in each cycle of the machine for disabling the latch means.

14. A bookkeeping machine having, in combination, a laterally movable paper carriage, a platen mounted in the carriage for rotation on a fixed axis, said carriage having a portion movable away from the platen to a position to permit ready insertion and removal of papers, detent means connected to said portion and tending to hold said portion in or out of said position, and latch means to prevent the detent means from holding said portion in said position.

15. A paper carriage having, in combination, a framework, a platen rotatably mounted in said framework on a fixed axis, a frame pivoted in said framework to swing on an axis located below and forward of the platen, said frame being approximately as long as the platen, a second frame pivoted to the first frame, guide means on the second frame to guide a work-piece down past the front of the platen, and detent means connected to the second frame to hold said second frame in either of two positions.

16. A paper carriage having, in combination, a framework, a platen rotatable in said framework on a fixed axis, a frame pivoted to swing on an axis located below and forward of the platen, said frame being approximately as long as the platen, a second frame pivoted to the ends of the first frame, guide means on the second frame for the work-piece, and a paper finger on the second frame to hold the work-piece against the platen, said guide means and said paper finger being laterally adjustable on the second frame past each other in either direction without interference one with the other.

17. A paper carriage having, in combination, a framework, a platen rotatably mounted in said framework, a frame pivoted to swing on an axis located below and forward of the platen, said frame being approximately as long as the platen, a second frame pivoted to the ends of the first frame, two oppositely disposed paper chutes on the second frame for the work-piece, and a paper finger on the second frame to hold the work-piece against the platen, said paper finger being laterally adjustable on the second frame past the paper chutes.

18. A paper carriage having, in combination, a framework, a platen rotatably mounted in said framework, a frame pivotally mounted in the framework forwardly of the platen, said frame being approximately as long as the platen, a second frame pivoted to the ends of the first frame and comprising two cross-bars, guide means on one of said bars for the work-piece, and a paper finger on the other bar to hold the work-piece against the platen, said guide means and said paper finger being laterally adjustable on their respective bars without interference of the paper fingers with the guide means.

19. A paper carriage having, in combination, a framework, a platen rotatable in said framework, a structure supported in the framework and extending forward and above the platen, said structure being approximately as long as the platen, guide means on said structure above the platen for the work-piece, and a paper finger on said structure above the platen to hold the work-piece against the platen, said guide means and said paper finger being laterally adjustable on said structure past each other without interference with each other.

20. A bookkeeping machine having, in combination, a laterally movable paper carriage, a platen rotatable on a fixed axis in said carriage, a frame pivoted on said carriage to swing forward and back on an axis located forward of the platen, a paper finger carried by said frame and extending downwardly toward the platen, type bars movable up to a multiplicity of printing positions in front of the platen, and a feed roll on the paper finger arranged to bear on the platen when said frame is in its rear position, said feed roll being then rearward of the path of movement of the type bars whereby the type bars may move up past the feed roll without striking the latter.

21. A paper carriage having, in combination, a framework, a platen rotatably mounted in said framework on a fixed axis, a frame pivoted in said framework, said frame being approximately as long as the platen and comprising means below the platen for guiding a work-piece, a second frame pivoted to the framework and to the first frame, guide means on the second frame to guide a work-piece down past the front of the platen, and a downwardly extending paper finger on the second frame to hold the work-piece against the platen.

22. A paper carriage having, in combination, a framework, a platen rotatably mounted in said framework on a fixed axis, a frame pivoted in said framework to swing on an axis located below and forward of the platen, a second frame pivoted to the first frame, two paper chutes disposed opposite each other on the second frame to guide a work-piece down past the front of the platen, and a paper finger on the second frame to hold the work-piece against the platen.

23. A paper carriage having, in combination, a framework, a platen rotatably mounted in said framework, a frame pivoted in said framework to swing on an axis located below and forward of the platen, said frame being approximately as long as the platen, a second frame pivoted to the first frame and comprising two bars extending lengthwise of and above the platen, two paper chutes on one of said bars, one for each side edge of the work-piece, and a paper finger on the other bar to hold the work-piece against the platen.

24. A paper carriage having, in combination, a framework, a platen rotatably mounted in said framework, a frame pivoted in said framework to swing on an axis located below and forward of the platen, said frame being approximately as long as the platen and comprising a curved paper-guiding plate extending lengthwise of and below the platen, a second frame pivoted to the first frame, two paper chutes on the second frame, one for each side edge of the work-piece, and a paper finger on the second frame to hold the work-piece against the platen.

25. A paper carriage having, in combination, a framework, a platen rotatably mounted in said framework, a frame pivoted at its ends in said framework to swing on an axis located below and forward of the platen, said frame being approximately as long as the platen, a second frame pivoted to the ends of the first frame and comprising means extending lengthwise of and above the platen, two paper chutes on said means, one for each side edge of the work-piece, and a paper finger on said means to hold the work-piece against the platen.

26. A paper carriage having, in combination, a framework, a platen rotatably mounted on a fixed axis in the framework, and means for directing a work-piece, face forward and bottom edge down, approximately vertically downward past the front of the platen, said means comprising a structure pivoted in the framework to swing toward and away from the platen, said structure comprising end-pieces which are adjacent to the ends of the platen, means connecting the upper portions of said end-pieces and extending above the platen so as not to obscure the platen, and a paper finger carried by and extending downwardly from said connecting means for holding the work-piece against the platen.

27. A paper carriage having, in combination, a framework, a platen rotatably mounted on a fixed axis in the framework, and means for directing a work-piece, face forward and bottom edge down, downward past the front of the platen, said means comprising a structure pivoted to swing toward and away from the platen, said structure comprising means extending above the platen so as not to obscure the platen, two chutes adjustably mounted on said last-mentioned means to hold said work-piece, and a paper finger also carried by said last-mentioned means for holding the work-piece against the platen.

28. A paper carriage having, in combination, a framework, a platen rotatably mounted in the framework, and means for directing a work-piece, face forward and bottom edge down, downward past the front of the platen, said means comprising a structure pivoted on an axis below the platen to swing toward and away form the platen, said structure comprising end-portions which are adjacent to the ends of the platen, a curved guide plate attached to and extending between said end-portions below the platen, and a cross-member connecting the upper portions of said end-portions and extending above the platen so as not to obscure the platen.

29. A bookkeeping machine having, in combination, a manipulative element to initiate cycling of the machine, a paper carriage having a portion movable to a position to permit ready insertion and removal of papers, detent means tending to hold said portion in or out of said position, latch means to prevent the detent means from holding said portion in said position, and means actuated by said portion for enabling said element when said portion is out of said position and for disabling said element when said portion is in said position.

30. A bookkeeping machine having, in combination, a manipulative element to initiate cycling of the machine, a paper carriage, a platen rotatably mounted in the carriage, a paper-holding frame pivoted in the carriage for movement toward and away from the platen, detent means tending to hold said frame in adjusted position, latch means to prevent the detent means from holding said frame in a certain adjusted position, and means actuated by said frame for enabling said element when said frame is in one position and for disabling said element when said frame is in another position.

31. A bookkeeping machine having, in combination, a manipulative element to initiate cycling of the machine, a paper carriage, a platen rotatably mounted in the carriage, a paper-holding device mounted in the carriage for movement toward and away from the platen, and means actuated by said device for enabling said element when said device is in one position and for disabling said element when said device is in another position.

32. The combination of a rotary platen, means to direct a work-piece from the rear of the platen down under and up past the front of the platen, said means including a feed roll below the platen, and means for directing a work-piece down past the front of the platen and under said feed roll and up behind the platen, the last mentioned means including a curved guide plate underlying said feed roll, and a feed roll arranged to hold both work-pieces against the upper front portion of the platen, whereby both work-pieces may be fed up past the front of the platen.

33. The combination of a rotary platen, means to direct a work-piece from the rear of the platen down under and up past the front of the platen, said means including a feed roll below the platen, and means for directing a work-piece down past the front of the platen and below the feed roll, the last mentioned means including a feed roll arranged to hold both work-pieces against the upper front portion of the platen, whereby both work-pieces may be fed up past the front of the platen.

34. A bookkeeping machine having, in combination, a platen mounted for rotation on a fixed axis, front feed means arranged for movement into and out of paper-receiving position, a manipulative element to initiate cycling of the machine, and means for placing said front feed means in a certain position, said last mentioned means being effective to disable said manipulative element.

35. A bookkeeping machine having, in combination, a laterally movable paper carriage, a platen mounted in the carriage for rotation on a fixed axis, front feed means on the carriage arranged for movement into and out of paper-receiving position, a manipulative element to initiate cycling of the machine, and means automatically actuated in the movement of the carriage for placing said front feed means in a certain position, said last mentioned means being effective to disable said manipulative element.

36. A bookkeeping machine having, in combination, a laterally movable paper carriage, a platen mounted in the carriage for rotation on a fixed axis, front feed means on the carriage arranged to swing toward and away from the platen, means automatically operable as an incident to movement of the carriage to swing the front feed means away from the platen, a manipulative element to initiate cycling of the machine, and means automatically actuated in the movement of the carriage for disabling said element.

37. A bookkeeping machine having, in combination, a paper carriage, a platen mounted in the carriage, a paper holding frame pivoted on the carriage to swing toward and away from the platen, a manipulative member to initiate cycling of the machine, and connections between said frame and said member for controlling the latter.

38. A bookkeeping machine having, in combination, a laterally movable paper carriage, a platen in said carriage, a frame pivoted in the carriage to swing toward and away from the platen, a manipulative element, and means automatically operable as an incident to the movement of said carriage for swinging said frame away from said platen and disabling said manipulative element.

39. A bookkeeping machine having, in combination, a manipulative element to initiate cycling of the machine, a paper carriage, a platen mounted in the carriage, a paper holding frame pivoted in the carriage for movement toward and away from the platen, and means actuated as an incident to operation of said manipulative element to prevent said paper holding means from remaining in one of said two positions.

40. A bookkeeping machine having, in combination, a paper carriage, a platen mounted in the carriage, a paper holding frame pivoted on the carriage for movement to either of two positions, means tending to hold said frame in either of its two positions, a latch arm pivoted on the carriage, an operative connection between said frame and said latch, a bar pivoted on and extending longitudinally of the carriage, a manipulative member, and means controlled by said latch and said bar for controlling said member.

41. In a bookkeeping machine, in combination, a paper carriage, a platen rotatably mounted in the carriage, a frame comprising two end pieces pivoted to the ends of the carriage at points in front of the axis of the platen to swing forward away from and back toward the platen, and further comprising two parallel cross-bars attached to the upper portions of the end pieces, a pair of paper chutes mounted on one of the cross-bars for adjustment longitudinally thereof, and paper feed rolls adjustably mounted on the other cross-bar for adjustment longitudinally thereof, said feed rolls, when said frame is in its rearward position, being arranged to bear against the upper portion of the platen at points below the paper chutes, the forward movement of the frame producing a space between the feed rolls and the platen for the reception of a work-piece inserted bottom-edge downward into said chutes.

42. In a front-feed paper carriage, in combination, a carriage, a platen rotatably mounted therein, a curved plate fixed in the carriage below the platen to support the lower portion of a work-piece, and a guide plate pivoted in the ends of the carriage forwardly of the curved plate and below the platen in position to guide the lower edge of the work piece to said curved plate, the upper edge of said guide plate being below the printing line and being movable forward away from the platen to provide space for the entrance of the lower edge of the work-piece and being movable back toward the platen to normal position, and means to feed the work-piece up, said means comprising a feed roll mounted for movement with the guide plate to produce a space between said feed roll and the platen for the reception of a work-piece inserted bottom-edge downward and movable back to press the work-piece against the platen above the printing line.

43. A bookkeeping machine having, in combination, a paper carriage provided with a platen mounted in said carriage on a stationary axis, a group of type bars having an approximately vertical path of movement closely adjacent to the surface of said platen, and means to permit the insertion of a work-piece face forward and bottom edge downward, downward through the space between such platen and type bars, said means including a frame pivoted on the frame of the carriage for movement about a single axis located in front of and adjacent to the platen, and movable into a forward position away from the platen to provide space for the insertion of the work-piece, or rearwardly toward the platen to hold the work-piece in proper relation to the platen, and means on the frame to cause the work-piece to move with the frame toward and away from the platen.

44. A bookkeeping machine having, in combination, a paper carriage provided with a platen mounted in said carriage on a stationary axis, a group of type bars having an approximately vertical path of movement closely adjacent to the surface of said platen, and means to permit the insertion of a work-piece face forward and bottom edge downward, downward through the space between such platen and type bars, said means comprising a lower frame having a guide plate pivoted to swing on an axis located below and forward of the platen, an upper frame which has a pivotal connection with the lower frame and also with the ends of the carriage, the two frames being movable simultaneously into a forward position away from the platen to provide space for the insertion of the work-piece, or rearwardly toward the platen to hold the work-piece in proper relation to the platen, and means on the upper frame to cause the work-piece to move with the frame toward and away from the platen.

OSCAR J. SUNDSTRAND.